Dec. 26, 1950  C. M. SEIBEL  2,535,164
CONTROL MECHANISM FOR HELICOPTERS
Filed May 31, 1947  3 Sheets-Sheet 1
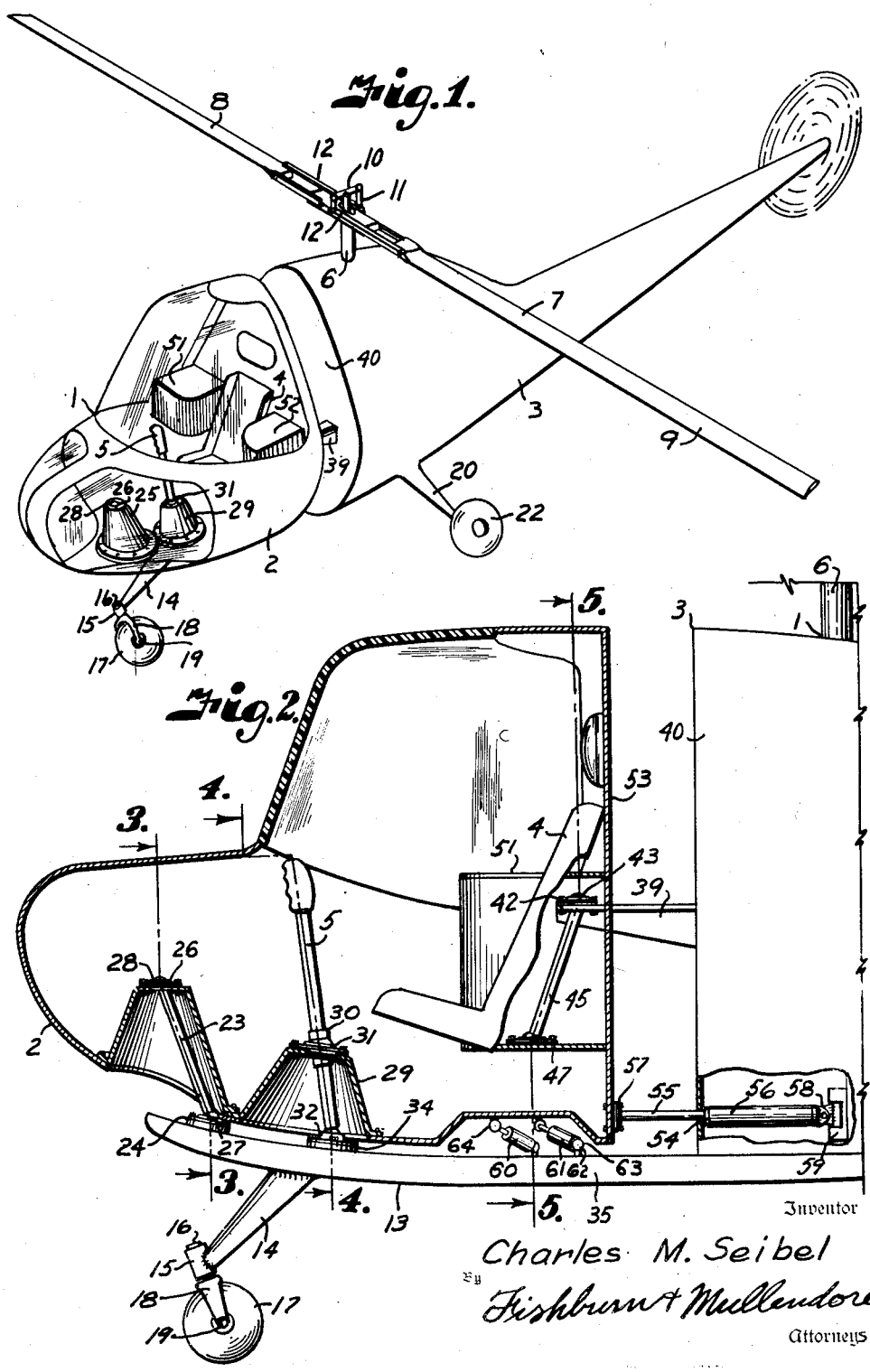
Inventor
Charles M. Seibel
By Fishburn & Mullendore
Attorneys Dec. 26, 1950     C. M. SEIBEL     2,535,164
CONTROL MECHANISM FOR HELICOPTERS
Filed May 31, 1947     3 Sheets-Sheet 2
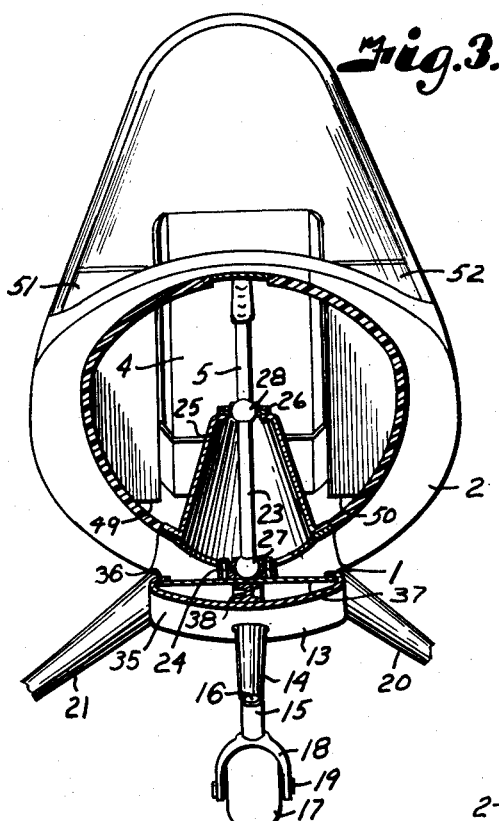
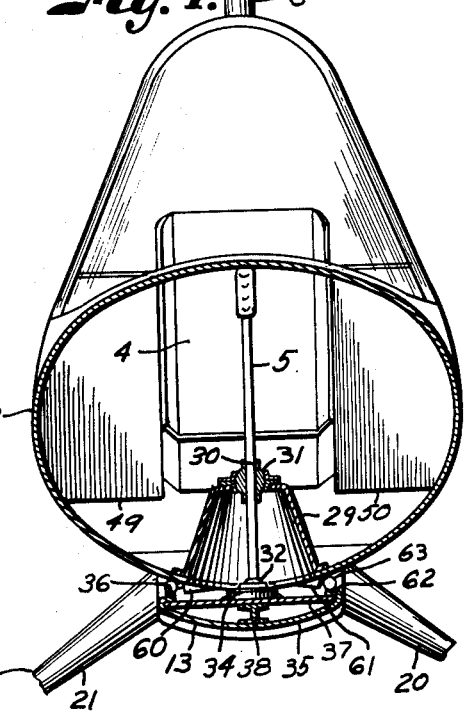
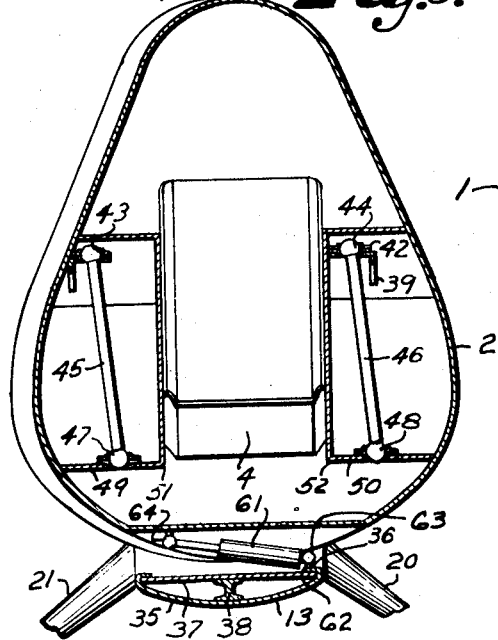
Inventor
Charles M. Seibel
By Fishburn & Mullendore
Attorneys

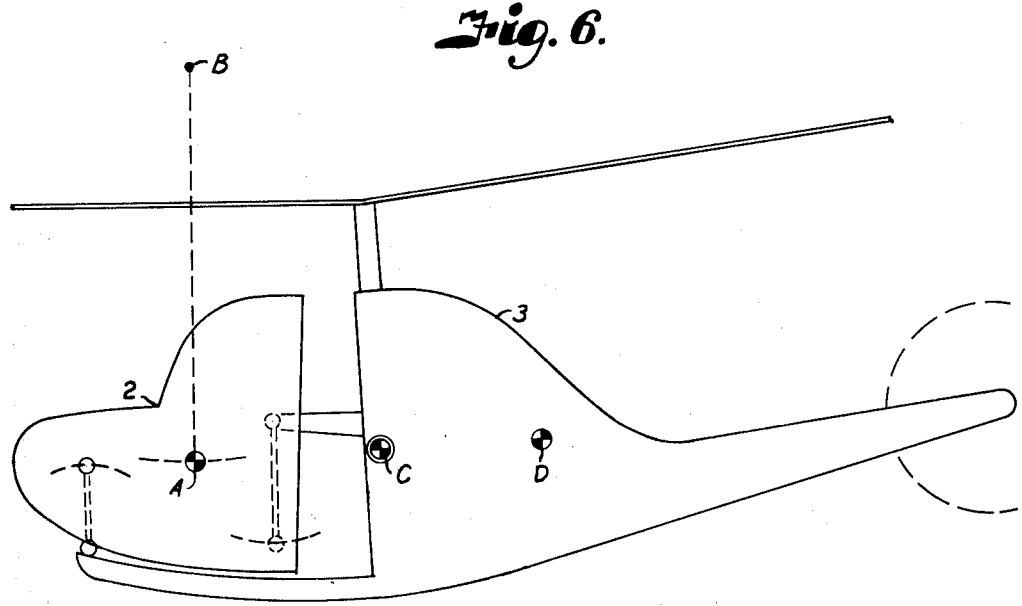
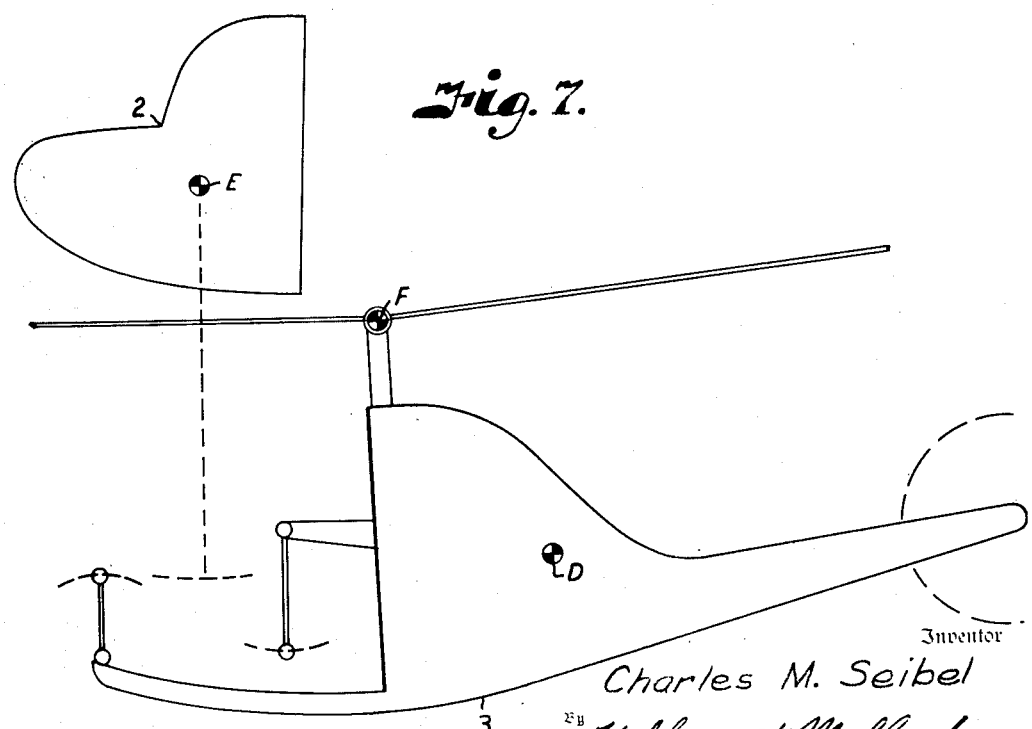

Patented Dec. 26, 1950

2,535,164

UNITED STATES PATENT OFFICE 2,535,164

CONTROL MECHANISM FOR HELICOPTERS

Charles M. Seibel, Wichita, Kans.

Application May 31, 1947, Serial No. 751,589

11 Claims. (Cl. 244—17.11)

This invention relates to helicopters, and more particularly to mechanism for controlling direction of travel of the helicopter.

Heretofore with helicopters of this character, the lateral and longitudinal control of the machine has been accomplished by the use of cyclic pitch changes on the rotor blades together with independent flapping hinges for the blades or with a see-saw hinge which operates as a flapping hinge for the blades of a two-bladed rotor. With such equipment the lift vector, or direction of lift, is altered by the application of cyclic pitch control. The change in relative positions of the lifting force and the center of gravity thereby creates the necessary moments or change in balance for control.

It is the principal object of the present invention to accomplish the lateral and longitudinal control of the helicopter by moving the center of gravity in flight and in this manner obtain the necessary relative change in position between the lift vector and center of gravity.

Other objects of the present invention are to provide a simplified control system for a helicopter or the like which is capable of providing adequate longitudinal and lateral control; to provide a device of this character having a fuselage divided into parts; to provide means for shifting one of the parts relative to the other; to provide a device of this character which will lend stability to the helicopter in hovering flights; and to provide a device of this character simple, economical to manufacture and efficient in operation.

In accomplishing these and other objects of the present invention, I have provided improved details of structure, the preferred form of which is illustrated in the accompanying drawings, wherein:

Fig. 1 is a perspective view of the helicopter embodying the features of my invention with parts broken away to better illustrate the structure.

Fig. 2 is a vertical longitudinal section through the helicopter, particularly illustrating the links or arms and dampers connecting the fuselage sections.

Fig. 3 is a transverse sectional view taken on the line 3—3, Fig. 2.

Fig. 4 is a transverse cross-section taken on the line 4—4, Fig. 2.

Fig. 5 is a transverse cross-section taken on the line 5—5, Fig. 2.

Figs. 6 and 7 are diagrammatic side elevational views illustrating the movement of center of gravity upon relative change in position of the fuselage sections.

Referring more in detail to the drawings:

1 designates an aircraft, such as a helicopter or the like, embodying the features of my invention comprising a fuselage having separate sections 2 and 3. The fuselage section 2 comprises the cab of the machine and is provided with a seat 4 for the operator of the device and a control stick 5. The rear section 3 of the fuselage houses a motor (not shown) for operating a drive shaft 6 for rotating a rotor 7.

It will be understood that although the drawings illustrate only one seat, it is possible to apply the invention to larger machines in which case additional seats and cargo space can be provided in fuselage part 2 and fuselage part 3.

The rotor here illustrated comprises blades 8 and 9. A pitch change cross tube 10 is provided perpendicular to the rotor blades having links 11 connected to horns 12 or the like for changing the pitch of the blades. The lower ends of the links 11 are adapted to lie on the extensions of the see-saw axis of the rotor as indicated at 12 (Fig. 1). When the rotor moves on the see-saw axis the blade pitch will not be changed with this arrangement.

13 designates a boom or the like adapted to underlie the fuselage and extending longitudinally thereof. The forward end of the boom carries a downwardly and obliquely extending arm 14 provided with a bearing 15 for a pin 16 for accommodating a wheel 17 at the front of the machine, the pin 16 having the usual pivotal connection and brackets 18 carrying an axle 19 for the wheel 17. Arms 20 and 21 are also provided on each side of the fuselage section 3 for mounting wheels 22 for supporting the rear fuselage section when grounded.

The fuselage section 2 is secured to the boom 13 by a link pin 23 mounted at the forward end thereof in a bearing 24 secured to the boom. The link extends upwardly a substantial distance in a housing 25 and has its upper end connected in a bearing 26 carried by the top of the housing. The connections of both the upper and lower ends of the link may be ball and socket as indicated at 27 and 28 (Fig. 3). Other means which will allow swiveling of said links in any direction may be used. For example a gimbal with pins at right angles, thereby comprising a universal joint would prove satisfactory. For convenience further reference to ball and socket joints can be interpreted as any means for obtaining the action of a ball and socket joint. The guide stick 5 also extends through a housing 29 on the bottom of the fuselage section 2, and the lower end of the stick is pivotally connected in a bearing 30 through ball and socket joint as indicated at 31 (Fig. 4), and extends through the bottom of the fuselage section and has ball and socket connection 32 with a bearing 34 on the boom 13 so that the fuselage section 2 may be moved forwardly, rearwardly and sidewise to the boom and to the rear fuselage section 3, as will later be described.

The boom 13 may be of any suitable form, but I have here illustrated an elongated member 35 having its outer edges flanged as indicated at 36 adapted to receive a substantially flat member 37, the elongated member 35 being curved and an I-beam or the like 38 inserted between the two pieces 35 and 37 to provide a rigid structure. The rear fuselage section is rigidly secured to the boom by suitable means such as welding or the like.

The fuselage sections 2 and 3 are connected by arms 39 having their rear ends rigidly secured through the forward end 40 of the fuselage section 3 by any suitable means and having their forward ends rigidly secured to base plates 42 of ball and socket joints 43 and 44 for links 45 and 46 having their lower ends connected to a ball and socket joint 47 and 48 carried on the bases 49 and 50 of box housings 51 and 52 located inside of the fuselage section 2. The supporting links 45 and 46 are located rearwardly of the seat 4 so that the pilot will have plenty of room to operate the machine, the seat being approximately midway between the front link 23 and the rear links 45 and 46. It will be noted that the arms 39 extend through the rear end 53 of the fuselage section 2, the end being cut out to accommodate the arms, the boxes or housings 51 and 52 covering the openings for the arms.

In order to provide stability in hovering flight of the machine, I preferably provide dampers 54 connecting the front and rear fuselage sections as best illustrated in Fig. 2 for damping longitudinal motions of the movable fuselage section 2. The dampers comprise pistons 55 operating in cylinders 56 containing a liquid as is the usual practice. The forward end of the piston is pivotally connected to the rear end 53 of the front fuselage section by ball and socket connection as indicated at 57, and the rear end of the cylinder is pivotally connected as indicated at 58 to a bracket 59 carried by the rear fuselage section as best illustrated in Fig. 2. Other forms of dampers may be used, as the pistons and cylinders are merely illustrative.

For damping lateral or sidewise motions of the movable fuselage section 2, I provide dampers 60 and 61 having one end attached to brackets 62 carried by the boom 13 by ball and socket joints as indicated at 63 (Fig. 2) and their opposite ends similarly connected to the bottom of the fuselage section 2, as indicated at 64.

In operation of a device constructed and assembled as described, the pilot may operate the stick 5 to control the direction of travel of the machine and movement of one fuselage section with respect to the other, and more particularly the cabin or front fuselage section 2 may be moved with respect to the rear section by change of position of the stick in any desired direction due to its ball and socket connection indicated at 34 with the boom 13, the links 23 and 46 allowing movement of the cab in a direction relative to the rear section. The cab or front fuselage section is built of any suitable material and is preferably light and easily shiftable with respect to the boom.

It will be obvious from the foregoing that the center of gravity of the cabin or front fuselage section moves relative to the rest of the machine, the center of gravity of the cabin moving in an arc, the center of which lies above the rotor.

In order to assure hovering stability, the center of this arc is chosen so that the fuselage part 2 when disconnected from its present location by removing links 45, 46 and 5 and relocated by suitable means so that the center of gravity of the fuselage part 2 lies on the center of said arc, then the center of gravity of the complete machine must lie on or near the center of the lifting rotor.

Figs. 6 and 7 of the drawings illustrate an example of a hypothetical instance of change in center of gravity between the fuselage sections. In Fig. 6 before relocating the fuselage section 2, the center of gravity of this section is at A and the center of the arc or center of oscillation point is at B. The combined centers of gravity of the fuselage sections 2 and 3 are at a point marked C and the center of gravity of the section 3 is indicated at D.

When the fuselage section 2 is relocated so that it is above the rotor, the center of gravity of the complete machine in this hypothetical configuration lies on near the center of the rotor and the center of the arc has been properly chosen. If the center of gravity is found to lie above the rotor, it is necessary to choose a center of oscillation lower or nearer the rotor in order to lower the center of gravity to the rotor when the fuselage section 2 is in this hypothetical position. The converse is true if the center of gravity is found to lie below the rotor.

The center of gravity of fuselage section 2 moves in an arc with the center at B when the motions of the fuselage section are forward, rearward, or from side to side, or diagonal. In other words, the center of gravity moves on an imaginary spherical surface, the center of which is at point B.

In Fig. 7 point B is located in such a manner so that the combined centers of gravity of the complete machine lie on or near the rotor center for the hypothetical condition in which the fuselage section 2 is located at point B.

It is obvious from the foregoing discussion that the movable fuselage part 2 may be connected to the fuselage part 3 by any suitable means which will cause the center of gravity of fuselage part 2 to move in said arc described above for any type of relative motions between the fuselage parts, whether it be forward, rearward, from side to side, or along any intermediate path. For instance, fuselage part 2 could be supported on a cup shaped or segment of a spherical shell, the center of curvature of which is described by the foregoing description of the center of said arc. There are many methods by which fuselage part 2 can be connected to fuselage part 3 to obtain the proper point of oscillation or rotation as specified in the foregoing discussion. The most suitable means has been described and illustrated.

Referring particularly to Fig. 7, the center of gravity of the fuselage section 2 is at E when it is relocated as well as the center of arc at this point. The combined centers of gravity of parts 2 and 3 are indicated at F, while the center of gravity of the fuselage section 3 remains at D. The center of gravity E is located in such a manner so that the combined centers of gravity of the complete machine lie on or near the rotor center for the hypothetical condition in which fuselage section 2 is located at point E.

The foregoing discussion has been concerned with a single lifting rotor machine. However it is obvious that the same discussion can be applied to a coaxial helicopter in which the rotors are vertically disposed along coaxial drive shafts. In this latter case the point of oscillation is chosen approximately midway between the two lifting rotors or in other words at or near the center of lift of the two rotors.

It will be obvious from the foregoing that I have provided a control mechanism for a helicopter or the like in which the pilot may move the forward fuselage section relative to the rear fuselage section forwardly and rearwardly or from side to side and in this manner effect control in these respective directions. In addition, the machine will possess dynamic stability in hovering flight by the proper use of damping and by the proper choice of the center of oscillation or rotation.

What I claim and desire to secure by Letters Patent is:

1. An aircraft of the character described comprising, a fuselage having forward and rear sections, a boom, means for rigidly supporting the rear fuselage section on said boom, links having ball and socket connection for pivotally mounting the forward fuselage section to said boom, arms pivotally connecting the forward fuselage section to the rear fuselage section, and means for moving said forward section relative to the rear section.

2. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, and means for moving said forward fuselage section relative to the rear fuselage section.

3. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, and means pivotally connected to said boom and operable from the forward fuselage section for moving said forward fuselage section relative to the rear fuselage section.

4. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, and an operating stick in the forward fuselage section and having ball and socket joint connection with the boom for moving said forward fuselage section relative to the rear fuselage section.

5. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, means for moving said forward fuselage section relative to the rear fuselage section, and dampers pivotally connecting the forward fuselage section to the rear fuselage section.

6. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, means pivotally connecting the forward fuselage section with the boom for moving said forward fuselage section relative to the rear fuselage section, and dampers pivotally connecting the forward fuselage section to the rear fuselage section.

7. An aircraft of the character described comprising, a fuselage having forward and rear sections, a boom, means for rigidly mounting the rear fuselage section to said boom, a link having ball and socket connection with said forward fuselage section and with said boom, arms connecting the forward fuselage section to the rear fuselage section, links having ball and socket connection with said arms and with the forward fuselage section, means for moving said forward fuselage section relative to the rear fuselage section, dampers pivotally connecting the forward fuselage section to the rear fuselage section, said dampers comprising pistons and cylinders, and a lubricant in said cylinders.

8. An aircraft of the character described comprising, a fuselage having forward and rear sections, means for supporting said sections relative to each other, means for pivotally mounting the forward fuselage section to said first named means, means pivotally connecting the said fuselage sections one to the other, means for moving one of said fuselage sections relative to the other, and means for damping relative longitudinal movement of the fuselage sections.

9. An aircraft of the character described comprising, a fuselage having forward and rear sections for relative longitudinal and lateral movement, a boom, means for rigidly supporting the rear fuselage section on said boom, means pivotally mounting the forward fuselage section to said boom, means pivotally connecting the forward fuselage section to the rear fuselage section, means for moving said forward section relative to the rear section, and means for damping relative longitudinal and lateral movements of the fuselage sections.

10. An aircraft of the character described comprising, a fuselage having forward and rear sections, a boom, means for rigidly supporting the rear fuselage section on said boom, links having one end pivotally secured to said boom and their other end to the forward fuselage section for pivotally mounting the forward fuselage section to said boom, means pivotally connecting the forward fuselage section to the rear fuselage section, and means for moving said forward section relative to the rear section.

11. An aircraft of the character described comprising, a fuselage having forward and rear sections, a boom, means for rigidly supporting the rear fuselage section on said said boom, links having one end pivotally secured to said boom and their other end to the forward fuselage section for pivotally mounting the forward fuselage section to said boom, are pivotally connecting the forward fuselage section to the rear fuselage section, and means for moving said forward section relative to the rear section.

CHARLES M. SEIBEL.

REFERENCES CITED

The following references are of record in the file of this patent:

UNITED STATES PATENTS

| Number | Name | Date |
|---|---|---|
| 897,738 | Gordon | Sept. 1, 1908 |
| 1,042,311 | Behrens | Oct. 22, 1912 |
| 1,057,444 | Mott | Apr. 1, 1913 |
| 1,094,898 | Hirth | Apr. 28, 1914 |
| 1,109,891 | Young | Sept. 8, 1914 |
| 1,491,310 | Perrin | Apr. 22, 1924 |
| 1,561,424 | Exel | Nov. 10, 1925 |
| 1,828,026 | Cline et al. | Oct. 20, 1931 |
| 2,487,646 | Gluhareff | Nov. 8, 1949 |